UNITED STATES PATENT OFFICE.

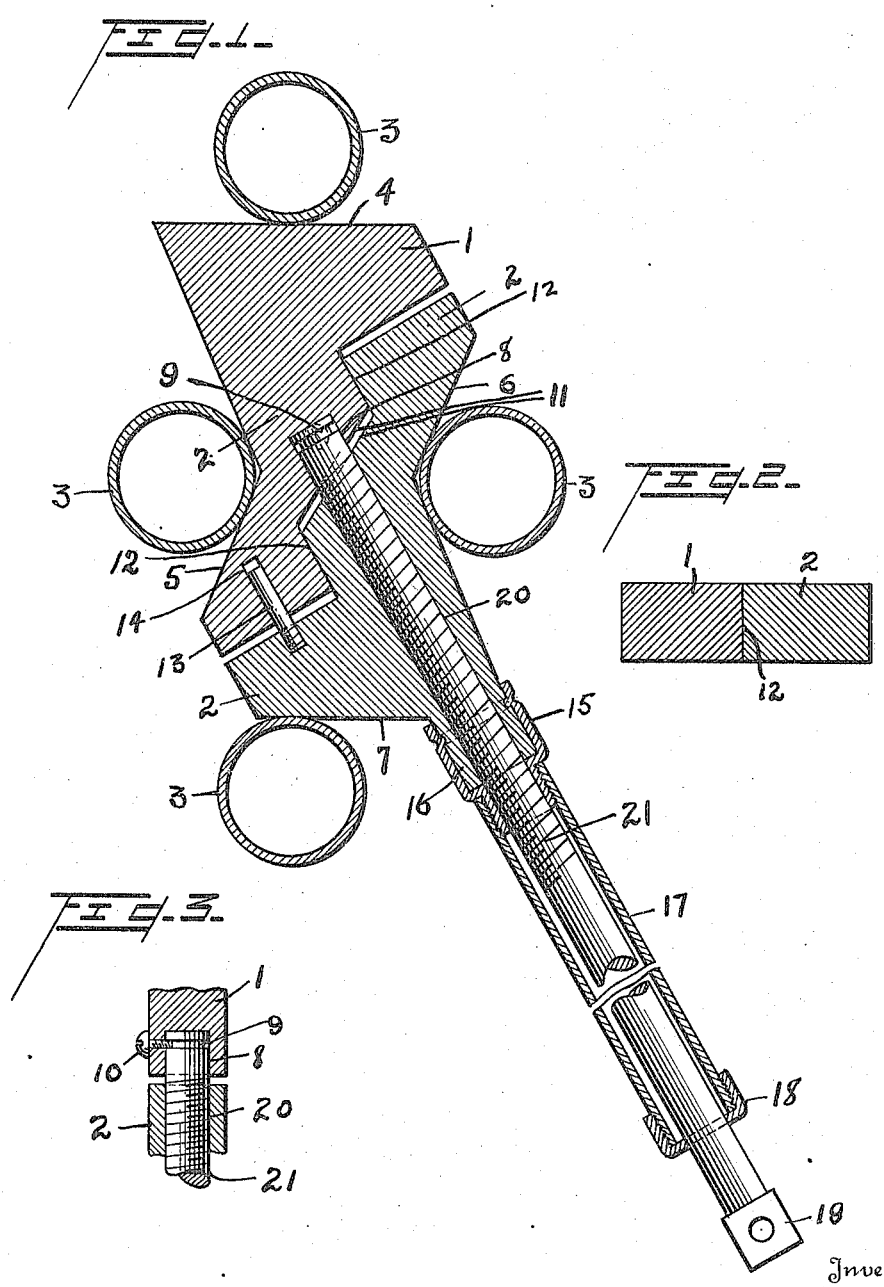

EDWIN J. HART, OF PHILADELPHIA, PENNSYLVANIA.

TOOL FOR SPREADING THE TUBES OF WATER-TUBE BOILERS.

1,185,091. Specification of Letters Patent. Patented May 30, 1916.

Application filed September 11, 1915. Serial No. 50,168.

*To all whom it may concern:*

Be it known that I, EDWIN J. HART, a citizen of the United States, residing at Philadelphia, in the county of Philadelphia and State of Pennsylvania, have invented certain new and useful Improvements in Tools for Spreading the Tubes of Water-Tube Boilers, of which the following is a specification.

My invention relates to improvements in tools for spreading the tubes of water-tube boilers, the object of the invention being to provide a simple, strong, durable tool which can be conveniently operated to spread the tubes of water-tube boilers so as to enable the positioning of bricks, tile, or other baffling device between the tubes.

A further object is to provide a tool of the character stated having two spreader heads which are so constructed and arranged that they are permitted a movement in one direction only, and are held against lateral and pivotal turning movement.

A further object is to provide a tool of the character stated which can be manufactured and sold at a reasonably low price, and which will be strong and durable in use.

With these and other objects in view, the invention consists in certain novel features of construction and combinations and arrangements of parts as will be more fully hereinafter described and pointed out in the claims.

In the accompanying drawings: Figure 1 is a view in longitudinal section illustrating my improvements. Fig. 2 is a view in section on the line 2—2 of Fig. 1, and Fig. 3 is a fragmentary view in longitudinal section transversely of the header illustrating the manner of connecting one spreader head to the adjusting rod.

1 and 2 represent the two members of my improved spreader, which I shall hereinafter refer to as spreader heads as they both operate to spread boiler tubes 3 illustrated in section in Fig. 1.

The spreader head 1 has working faces 4 and 5, while the head 2 has working faces 6 and 7, so that when the members 1 and 2 are moved away from each other, they exert a spreading action on four boiler tubes 3.

The member 2 is provided with a longitudinal screw-threaded bore 20, in which a screw-threaded adjusting rod 21 is located. One end of the rod 21 which is preferably smooth, is located in a pocket 8 in member 1, and is provided with an annular groove 9 into which the inner end of a screw 10 in member 1 projects, so that while the rod is permitted a free turning movement in the pocket 8, the turning movement of the rod imparts a longitudinal movement to the member 1, causing the members to move toward and away from each other in accordance with the direction of the turning movement of the rod.

The adjacent faces of the members 1 and 2 are of somewhat stepped formation as shown clearly in Fig. 1. The adjacent faces 11 of the members at the center of the members are inclined or at an angle to the longitudinal axis of the rod, and at the ends of these inclined faces 11, the members have longitudinal bearing faces 12. These bearing faces are parallel to the longitudinal axis of the rod, and they are as wide as the members are wide, as shown clearly in Fig. 2, so that the members are held by such bearing faces 12 against any possibility of rotary or pivotal movement relative to each other. To prevent any possibility or tendency of the members to separate laterally, I provide a guide pin 13 which is secured in member 2, and is movable into a recess 14 in member 1.

A pipe coupling 15 is shrunk or otherwise rigidly secured to the restricted lower end 16 of member 2, and a tube 17 is screwed onto this coupling and incloses the greater portion of rod 21. A cap 18 is screwed onto the free end of the rod 21 closing the end of the tube, and the end of the rod is provided with an angular perforated enlargement 19 as shown to facilitate the turning movement of the rod.

When the tool is in the position shown in Fig. 1, a turning movement of the rod 21 in one direction will cause members 1 and 2 to separate, the bearing faces 12 operating to compel the members to move in a longitudinal direction only, preventing any possibility of pivotal or lateral movement, and insuring a uniform disposition of the tubes, equalizing the strains on all parts of the device, and insuring a proper operation.

The pin 13 assists rod 21 in holding the two members against lateral displacement, and the entire structure is strong and rigid to withstand the uses to which it is necessarily put.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tool for spreading the tubes of water-tube boilers, comprising two spreader heads, one spreader head having a screw-threaded bore, a screw-threaded rod engaging said bore and having a swiveled connection with the other head, and both of said heads having at opposite sides of the rod longitudinal bearing faces, said bearing faces of the full thickness of the members and parallel with the rod, substantially as described.

2. A tool for spreading the tubes of water-tube boilers, comprising two spreader heads, one spreader head having a screw-threaded bore, a screw-threaded rod engaging said bore and having a swiveled connection with the other head, and both of said heads having at opposite sides of the rod longitudinal relatively wide bearing faces, said bearing faces extending parallel with the rod and of the full thickness of both members, a guide pin secured in one member and the other member having a recess receiving the guide pin, substantially as described.

3. A tool for spreading the tubes of water-tube boilers, comprising two spreader heads, one spreader head having a screw-threaded bore, a screw-threaded rod engaging said bore and having a swiveled connection with the other head, and both of said heads having at opposite sides of the rod longitudinal bearing faces, a coupling secured on the end of the member having the screw-threaded bore, a tube screwed on the coupling and inclosing a portion of the rod, a cap on the end of the tube, and an enlargement on the end of the rod, substantially as described.

4. A tool for spreading the tubes of water-tube boilers, comprising two spreader heads, one spreader head having a screw-threaded bore, a screw-threaded rod engaging said bore and having a swiveled connection with the other head, and both of said heads having at opposite sides of the rod longitudinal bearing faces, said bearing faces extending the full width of both members, a guide pin secured in one member and the other member having a recess receiving the guide pin, a coupling secured on the end of the member having the screw-threaded bore, a tube screwed on the coupling and the guide pin, a coupling secured on the end of the tube, and an enlargement on the end of the rod, substantially as described.

In testimony whereof I have signed my name to this specification in the presence of two subscribing witnesses.

EDWIN J. HART.

Witnesses:
CHAS. E. POTTER,
MARIE JACKSON.

Copies of this patent may be obtained for five cents each, by addressing the "Commissioner of Patents, Washington, D. C."